(12) United States Patent
Lee

(10) Patent No.: US 12,473,602 B1
(45) Date of Patent: Nov. 18, 2025

(54) MULTI-DIAGNOSTIC KIT FOR MOSQUITO-BORNE DISEASES AND METHOD FOR THE DIAGNOSIS OF THE DISEASES

(71) Applicant: Yoonchae Kalya Lee, Gyeonggi-do (KR)

(72) Inventor: Yoonchae Kalya Lee, Gyeonggi-do (KR)

(*) Notice: Subject to any disclaimer, the term of this patent is extended or adjusted under 35 U.S.C. 154(b) by 0 days.

(21) Appl. No.: 18/941,352

(22) Filed: Nov. 8, 2024

(51) Int. Cl.
*C12Q 1/70* (2006.01)
*C12Q 1/6893* (2018.01)
*G01N 21/78* (2006.01)

(52) U.S. Cl.
CPC ............ *C12Q 1/701* (2013.01); *C12Q 1/6893* (2013.01); *G01N 21/78* (2013.01); *C12Q 2600/156* (2013.01)

(58) Field of Classification Search
CPC ... C12Q 1/701; C12Q 1/6893; C12Q 2600/16
See application file for complete search history.

(56) References Cited

U.S. PATENT DOCUMENTS 10,072,309 B1 * 9/2018 Nyan .................. C12Q 1/703

OTHER PUBLICATIONS

Sharma, S. et al. Journal of Vector Borne Disease 59:29-36 (Mar. 2022). (Year: 2022).*
Puri, M. et al. Frontiers in Cellular and Infection Microbiology 12:961832 (10.3389/fcimb.2022.961832) (Aug. 2022). (Year: 2022).*
Moehling, T.J. et al. Expert Review of Molecular Diagnostics 21(1):43-61 (doi: 10.1080/14737159.2021.1873769) (online Jan. 2021). (Year: 2021).*
Alhakeem, R.S. et al. Using saliva and LAMP for non-invasive detection of communicable pathogens in low medical access regions. ChemRxiv preprint, Apr. 4, 2023 version 2, 24 pages (doi: 10.26434/chemrxiv-2023-hnqv1-v2) . . . (Year: 2023).*

* cited by examiner

*Primary Examiner* — Diana B Johannsen
(74) *Attorney, Agent, or Firm* — PLEECHAE IP, LLC

(57) ABSTRACT

A composition includes a first primer set consisting of the nucleotide sequences of SEQ ID Nos.1 to 6, and a second primer set consisting of the nucleotide sequences of SEQ ID Nos. 7 to 11. A multi-diagnostic kit for mosquito-borne diseases includes the composition. The multi-diagnostic kit enables rapid and accurate detection of dengue virus and malaria parasites by using specific primer sets. The multi-diagnostic kit is applicable in regions with high incidences of mosquito-borne disease pandemics including Africa and Latin America since it exhibits excellent thermal stability even in harsh environments.

15 Claims, 10 Drawing Sheets
Specification includes a Sequence Listing.

FIG. 2A

```
ATTCCAACAGTGATGGCGTTCCATTTAACCACACGTAACGGAGAACCACACATGATC
                  F3                     F2    FIP
GTCAGCAGACAAGAGAAAGGGAAAAGTCTTCTGTTTAAAACAGAGGATGGCGTGA
      LF                                          F1
ACATGTGTACCCTCATGGCCATGGACCTTGGTGAATTGTGTGAAGACACAATCACG
              B1                                 LB
TACAAGTGTCCCCTTCTCAGGCAGAATGAGCCAGAAGACATAGACTGTTGGTGCAA
              B2    BIP                          B3
```
(SEQ ID NO: 17)

FIG. 2B

```
TGCGAAAGCATTTGTCTAAAATACTTCCATTAATCAAGAACGAAAGTTAAGGGAGTG
       F3                        F2    FIP
AAGACGATCAGATACCGTCGTAATCTTAACCATAAACTATGCCGACTAGGTGTTGGA
      LF                               F1
TGAAAGTGTTAAAAATAAAAGTCATCTTTCGAGGTGACTTTTAGATTGCTTCCTTCAG
                                   B1
TACCTTATGAGAAATCAAAGTCTTTGGGTTCTGGGGCGAGTATTCGCGCAAGCGAG
       B2  BIP              B3
```
(SEQ ID NO: 18)

FIG. 2C

```
TTAGTTCGTGAATATGATTTGTCTGGTTAATTCCGATAACGAACGAGATCTTAACCT
     F3                    F2          FIP
GCTAATTAGCGGCAAATACGATATATTCTTACGTGGGACTGAATTCGGTTGATTTG
     LF                               F1
CTTACTTCGAAGAAAATATTGGGATACGTAACAGTTTCCCTTTCCCTTTTCTACTTA
                                 B1
GTTCGCTTTTCATACTGTTTCTTTTTCGCGTAAGAATGTATTTGCTTGATTGTAAAG
      B2  BIP              B3
```
(SEQ ID NO: 19)

Without Betaine

Add Betaine

MULTI-DIAGNOSTIC KIT FOR MOSQUITO-BORNE DISEASES AND METHOD FOR THE DIAGNOSIS OF THE DISEASES

REFERENCE TO AN ELECTRONIC SEQUENCE LISTING

A sequence listing electronically submitted on Nov. 8, 2024 as a XML file named 20241108_LC0962425_TU_SEQ.XML, created on Nov. 8, 2024 and having a size of 24,427 bytes, is incorporated herein by reference in its entirety.

BACKGROUND

1. Field of the Invention

The invention relates to a multi-diagnostic kit for dengue fever and Malaria transmitted by mosquitoes and a method for the diagnosis of the diseases.

2. Background of the Invention

The intersection of environmental change and biomedical issues is becoming increasingly important in the face of global warming. Infectious diseases that spread around the world are one of the leading causes of high mortality rates in vulnerable regions. It is necessary to focus on emerging infectious diseases and explores the tools needed to rapidly diagnose and respond to the global health impacts of climate change.

Climate change alters temperature, humidity, and rainfall patterns, which in turn affect the habitats and behaviors of pathogens and vectors such as mosquitoes and ticks. Elevated levels of carbon dioxide, a prominent greenhouse gas, trap heat in the atmosphere, leading to increased temperatures. This warming trend contributes to the melting of polar ice caps, rising sea levels, and unpredictable weather patterns, significantly influencing the proliferation and transmission dynamics of vector-borne diseases. Warmer temperatures accelerate mosquito development, enhance biting rates, and shorten disease incubation periods within mosquitoes. Consequently, regions experiencing rising temperatures face heightened risks of diseases such as malaria, dengue, Zika virus, and yellow fever.

The expansion in the areas in which mosquitoes thrive puts more communities at risk increases the number of months each year that are conducive to disease transmission in places already prone to mosquito-borne diseases. This is not limited only mosquito-borne diseases, as the sudden disease outbreaks and accelerating effects of climate change could lead to the emergence of unpredictable infectious diseases in the future.

Additionally, extreme weather events, such as floods and droughts, can disrupt ecosystems and increase human exposure to pathogens. This combination of environmental changes and evolving pathogens creates a landscape where new and unexpected infectious diseases could emerge, posing significant challenges to public health systems worldwide.

These, for instance, is predominantly concentrated in diseases impose substantial burdens on healthcare systems, particularly in communities with limited resources. Malaria in Africa accounts for approximately 95% of global cases. The disease, caused by the Plasmodium parasite and transmitted by female *Anopheles* mosquitoes, manifests in various species including P. falciparum and *P. vivax*, with P. falciparum being the most lethal. Dengue fever, on the other hand, is widespread in regions such as Southeast Asia and the Americas, but as temperatures rise, these areas may also see an increase in malaria cases.

Dengue infections are caused by four viruses named DEN-1, DEN-2, DEN-3, and DEN-4. The viruses share approximately 65% of the genomes, though there is some genetic variation. Despite these differences, infection with any of the dengue serotypes leads to the same disease and range of clinical symptoms. Although the distributions among the continents were unbalanced, by 2004, the geographical range of the four serotypes had greatly expanded. Today, all four dengue serotypes coexist in tropical and subtropical regions globally.

Malaria and dengue fever share similar symptoms such as fever, chills, headaches, muscle aches, nausea, and vomiting, making accurate diagnosis essential for effective treatment. Vulnerable populations, such as pregnant women, infants, children, individuals with HIV/AIDS, and travelers, are at higher risk of severe outcomes. Prompt and accurate diagnosis is crucial, as untreated P. falciparum and *P. vivax* infections can result in severe illness and death within 24 hours.

Treatments for malaria exist. Patients are prescribed medications to kill the malaria parasite. The type and duration of medication are based on the type of parasite. Some parasites are resistant to malaria drugs. Antimalarial drugs for curing malaria include Artemisinin-based combination therapies (ACTs), Atovaquone, Chloroquine, Doxycycline, Mefloquine, Quinine, and Primaquine. There is no specific medicine to treat dengue. Patients who are diagnosed dengue virus are recommended to see a healthcare provider. In order to cure dengue, patients are provided with specific drugs to pain symptoms. Acetaminophen (paracetamol) is commonly used to control pain while other drugs such as ibuprofen and aspirin can increase the risks of bleeding.

SUMMARY

An object of the invention is to provide a multi-diagnostic kit for mosquito-borne diseases. The multi-diagnostic kit allows the simultaneous detection of whether a subject is infected with dengue virus and/or malaria parasites.

The following technical solutions are adopted in the present invention to achieve the object.

The invention provides a multi-diagnostic kit for dengue and malaria, comprising a reagent composition comprising a first primer set consisting of the nucleotide sequences of SEQ ID Nos. 1 to 6, and a second primer set consisting of the nucleotide sequences of SEQ ID Nos. 7 to 11.

The multi-diagnostic kit amplifies target DNAs by the method of Loop-mediated Isothermal Amplification (LAMP) as described in FIG. 1. The primer sets of the invention are designed to be suitable for LAMP of the target DNAs.

The first primer set is for detecting dengue virus that causes dengue fever. The second primer set is for detecting Plasmodium falciparum: that causes fatal malaria. The reagent composition may optionally comprise a third primer set with nucleotide sequences of SEQ ID Nos. 12 to 16, which is for detecting *Plasmodium vivax* that causes malaria with relatively mild symptoms.

The reagent composition further comprises hydroxy naphthol blue (HNB) as a colorimetric indicator.

The reagent composition further comprises betaine, for clearer color change by HNB.

The first and second primer sets may be contained in one regent composition, or may be contained in a first reagent composition and in a second reagent composition, respectively.

The multi-diagnostic kit individually indicates the infection status of Dengue virus, Plasmodium falciparum, and *Plasmodium vivax*.

The invention provides a method for diagnosing dengue and malaria, comprising: adding DNA extracted from a sample to the reagent composition in the multi-diagnostic kit; and performing loop-mediated isothermal amplification of the DNA.

The amplification is carried out at 60 to 65° C. for 0.5 to 1 hour.

The method further comprises checking the color change of the reagent composition.

The sample is a blood, saliva, urine, or tissue.

The multi-diagnostic kit of the present invention enables rapid and accurate detection of dengue virus and malaria parasites by using the specific primer sets.

The loop-mediated isothermal amplification (LAMP) allows for time- and cost-efficient diagnosis of the mosquito-borne diseases in a single-tube.

The multi-diagnostic kit demonstrates high specificity and sensitivity for dengue virus and malaria parasites under isothermal conditions.

Hydroxy Naphthol Blue (HNB) allows for the direct visualization of DNA amplification results without the need for gel electrophoresis or fluorescent dyes. HNB changes color based on the magnesium ion concentration, which decreases as DNA is amplified in the reaction. A successful amplification causes a visible color change from violet to sky blue.

The multi-diagnostic kit exhibits excellent thermal stability, ensuring relatively accurate diagnostic results even in harsh environments.

The multi-diagnostic kit is applicable in regions with high incidences of mosquito-borne disease pandemics including Africa and Latin America.

The multi-diagnostic kit is suitable for long-term storage.

BRIEF DESCRIPTION OF THE DRAWINGS

FIGS. 2A to 2C show detailed primer designs for targeting specific sequence regions of (FIG. 2A) Dengue virus type 2 (SEQ ID No. 17), (FIG. 2B) Plasmodium falciparum (SEQ ID No. 18), and (FIG. 2C) *Plasmodium vivax* (SEQ ID No. 19).

In FIG. 4A, plasmid DNA samples for DENV, P. falciparum, and *P. vivax* are verified on a 1.5% agarose gel, with visible bands confirming plasmid presence. In FIG. 4B, PCR products amplified using LAMP outer primers for each target are shown, with distinct bands indicating successful amplification.

DETAILED DESCRIPTION OF THE INVENTION

Figure 1:
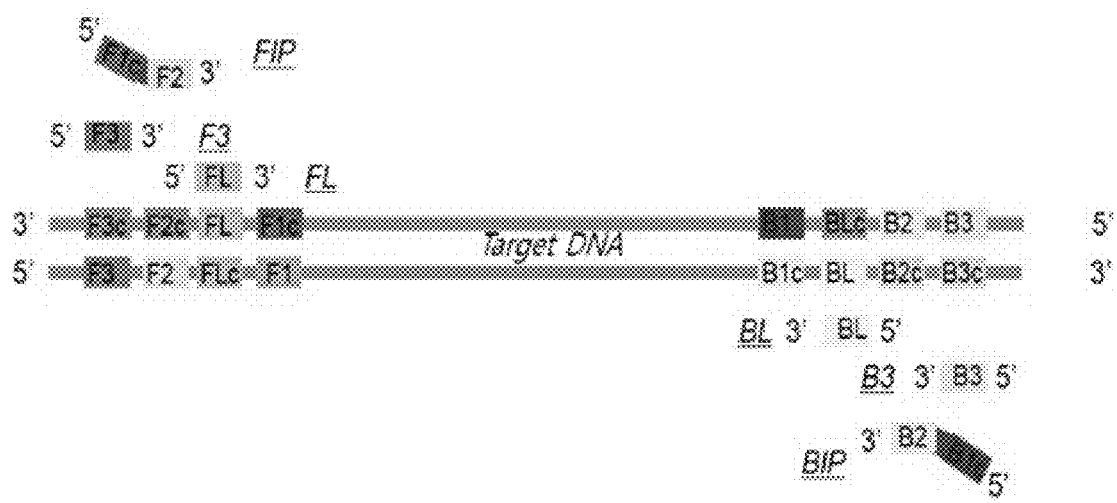
FIG. 1 illustrates the positions of a LAMP primer set (F3, B3, FIP, BIP, FL and BL) corresponding to the target DNA sequence. It shows the locations of each primer in the LAMP process, including: Outer Primers (F3 and B3) which are positioned on the ends of the target sequence and initiate the outer amplification, Internal Primers (FIP and BIP) which consists of sequences that bind to regions inside the target, helping to create the initial loop structure necessary for amplification, and Loop Primers (FL and BL) which bind to the single-stranded loop regions created by the internal primers, enhancing the speed and efficiency of the amplification reaction.
Figure 3:
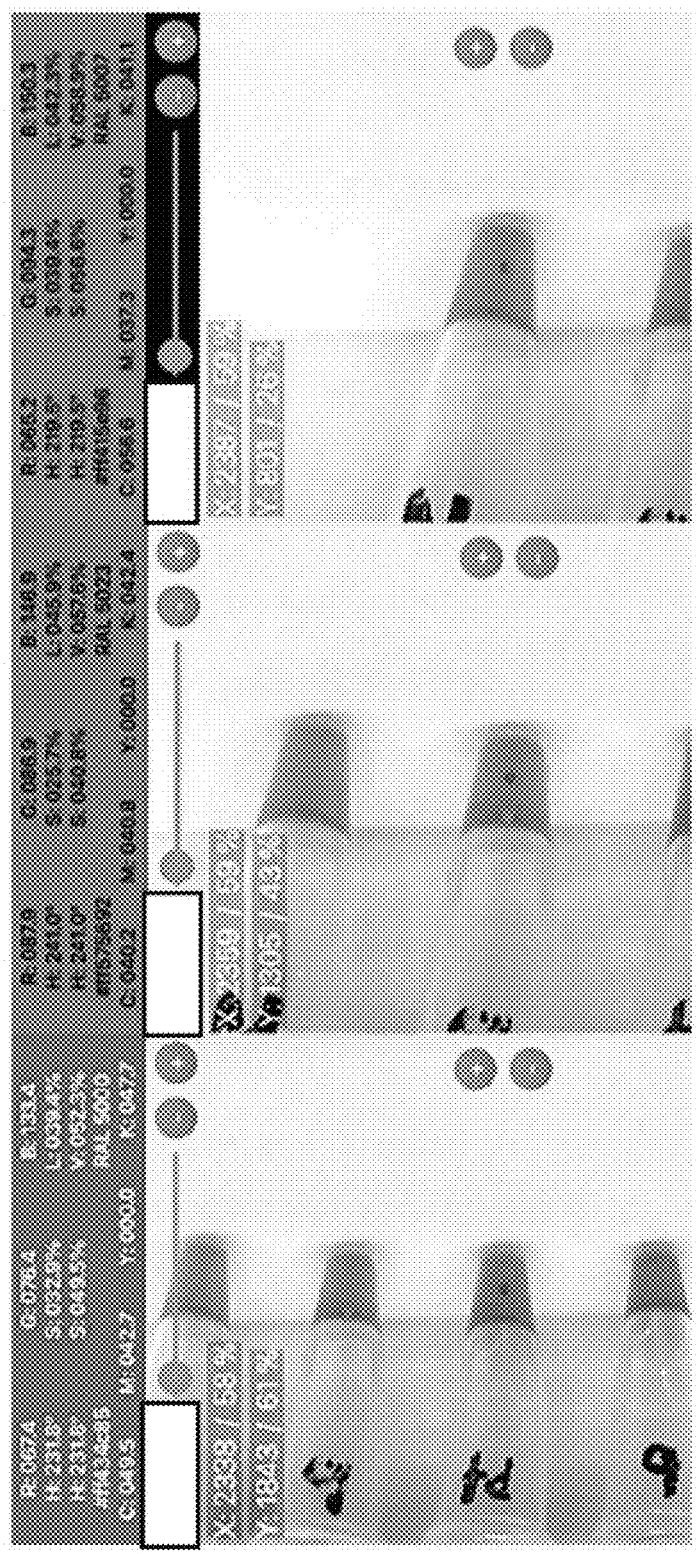
FIG. 3 illustrates the process of quantifying the color change of the reaction mixture using the RGB detector.

The present invention provides a multi-diagnostic kit for mosquito-borne diseases. The multi-diagnostic kit of the invention enables rapid and accurate detection of dengue virus and malaria parasites by using specific primer sets. The multi-diagnostic kit is applicable in regions with high incidences of mosquito-borne disease pandemics including Africa and Latin America since it exhibits excellent thermal stability even in harsh environments.

The reagent composition of the invention may comprise the followings:

(1) Primers: LAMP requires four to six primers to recognize six distinct regions on the target DNA. These include: Forward Inner Primer (FIP), Backward Inner Primer (BIP), Forward Outer Primer (F3), Backward Outer Primer (B3), Optional loop primers (LF and LB) to accelerate the reaction.

(2) DNA Polymerase: A strand-displacing DNA polymerase, such as Bst polymerase, which operates effectively at a constant temperature (60-65° C.) without the need for thermal cycling.

(3) dNTPs (Deoxynucleotide Triphosphates): The building blocks for DNA synthesis, including dATP, dTTP, dGTP, and dCTP, which are required for the polymerase to elongate the DNA strands.

(4) Buffer Solution: Typically includes Tris-HCl to maintain the optimal pH, as well as other salts like KCl and $MgSO_4$ (or $MgCl_2$) that stabilize the reaction environment and support enzyme activity.

(5) Betaine: used to reduce the formation of secondary structures in DNA, which can improve reaction efficiency and yield, especially in reactions with high GC content.

(6) Colorimetric Indicator: Indicators such as Hydroxy Naphthol Blue (HNB) or phenol red can be added to allow for visual detection of the amplification. When added, these indicators change color in response to changes in pH or ion concentration due to DNA synthesis, making it easy to observe results without electrophoresis.

(7) Template DNA: The sample DNA containing the target sequence to be amplified.

(8) Optional Additives: DMSO (dimethyl sulfoxide) or other additives can be used to improve reaction efficiency, especially with difficult templates.

The method for diagnosing dengue and malaria, comprising: adding DNA extracted from a sample to the reagent composition in the multi-diagnostic kit, and performing loop-mediated isothermal amplification of the DNA.

The loop-mediated isothermal amplification process includes: (i) binding of primers to target DNA, (ii) strand displacement and loop formation, (iii) cyclic amplification with inner and loop primers, and (iv) detection of amplification through visual, colorimetric, or fluorescent methods.

Hereinafter, the invention is described in detail with reference to the following Examples.

EXAMPLES

1. Sample Acquisition and DNA Preparation

Plasmid DNA containing diagnostic gene regions for pathogens Dengue virus type 2 strain (DENV) was acquired from Gyeongsang National University College of Medicine in Korea, P. falciparum, and *P. vivax* were acquired from Gachon University College of Medicine in Korea. The DNA was extracted from infected blood samples, and the essential gene regions were cloned into a T&A cloning vector (T-vector). These T-vector-cloned plasmid DNAs were used in the experiments to identify and confirm the presence of pathogens DENV, P. falciparum, and *P. vivax*.

The lengths of the diagnostic gene regions are indicated in Table 1.

TABLE 1

| Pathogen | Gene Region Length (bp) |
|---|---|
| DENV | 511 |
| *P. falciparum* | 2,092 |
| *P. vivax* | 2,064 |

2 Primer Design for LAMP Assay

The T-vector was utilized to incorporate sequences of interest to enable specific and sensitive detection of diagnostic targets. LAMP primers were then designed for each diagnostic sequence within the T-vector. LAMP primers were designed using Primer Explorer V5. Sequences were aligned and analyzed using Clustal Omeg to ensure uniqueness and specificity.

The design criteria for the primers included a length of 18-25 nucleotides, a GC content of 40-60%, and melting temperatures (Tm) of 60-65° C. for outer primers and 55-60° C. for inner primers. Primer specificity was confirmed through in silico analysis using BLAS.

For each diagnostic sequence (DENV, P. falciparum, and *P. vivax*), the primer sets were designed as shown in Table 2, and the primer positions according to the sequences is provided in FIGS. 2A and 2B.

TABLE 2

| Target | Primer set | | | Sequence (5' -> 3') |
|---|---|---|---|---|
| Dengue virus type 2 | first primer set | outer primer | F3 | SEQ ID No. 1 |
| | | | B3 | SEQ ID No. 2 |
| | | inner primer | FIP | SEQ ID No. 3 |
| | | | BIP | SEQ ID No. 4 |
| | | loop primer | LF | SEQ ID No. 5 |
| | | | LB | SEQ ID No. 6 |

TABLE 2-continued

| Target | Primer set | | | Sequence (5' -> 3') |
|---|---|---|---|---|
| *Plasmodium falciparum* | second primer set | outer primer | F3 | SEQ ID No. 7 |
| | | | B3 | SEQ ID No. 8 |
| | | inner primer | FIP | SEQ ID No. 9 |
| | | | BIP | SEQ ID No. 10 |
| | | loop primer | LF | SEQ ID No. 11 |
| *Plasmodium vivax* | third primer set | outer primer | F3 | SEQ ID No. 12 |
| | | | B3 | SEQ ID No. 13 |
| | | inner primer | FIP | SEQ ID No. 14 |
| | | | BIP | SEQ ID No. 15 |
| | | loop primer | LF | SEQ ID No. 16 |

3. Preparation of LAMP Buffer, Enzyme and LAMP Reaction

The LAMP reactions were performed in a total volume of 25 μL. The reaction mixture consisted of distilled water, 2.5 μL of 10× LAMP buffer, 1.4 mM of each deoxynucleotide triphosphate (dNTP), 8 U of Bst DNA polymerase (Enzynomics), 1.6 μM of each inner primer (FIP and BIP), 0.2 μM of each outer primer (F3 and B3), and 0.8 μM of each loop primer (LF and LB). The reaction mixes also included 0.8 M of betaine, 8 mM of magnesium sulfate ($MgSO_4$), and 120 μM of HNB as a colorimetric indicator. A 1 μL aliquot of the DNA template was added to each reaction.

To optimize the amplification conditions, the reaction mixtures were incubated at 65° C. for varying durations, specifically 0, 30, 45, 60, and 90 minutes. This step was essential to determine the optimal incubation time for the amplification process. Following optimization, the specificity of the LAMP assay was evaluated by incubating the reactions at 65° C. for 45 minutes, a duration selected based on preliminary optimization results.

Specificity experiments were conducted using a set of positive and negative controls. Positive controls consisted of reactions containing template DNA known to amplify under these conditions, while negative controls were reactions without template DNA to confirm the absence of non-specific amplification.

The LAMP buffer prepared for the amplification reaction was Thermopol buffer. The components of a 10× Thermopol buffer included 2 mL of 200 mM Tris-HCl, 1 mL of 100 mM $(NH_4)_2SO_4$, 1 mL of 100 mM KCl, 100 μL of 1% Triton® X-100 with pH 8.8 at 25° C., and 6.9 mL of water. The mixture was filtered using 0.2 μm syringe filter, resulting in 10 mL of Thermopol buffer.

The presence of amplification was determined visually based on the color change of HNB, with the color transition from purple to blue indicating a positive reaction. In cases where further confirmation was required, the products were analyzed by gel electrophoresis to verify the amplified fragments.

4. Agarose Gel Running

In order to run gel electrophoresis, 1.5× agarose gels were made. The agarose gel was prepared by weighing the agarose LE Master powder and mixing it with 100 mL of 1.5× TAE electrophoresis buffer in a flask. The agarose was dissolved by heating the mixture with a microwave until the solution was clear.

After cooling down the boiled solution, 120 μL of gel stain were added. The mixture was poured into the gel mold and left to dry.

5. RGB Detector

The application ColorDetector was employed to detect color differences over time following the reaction. The application provided the name of the detected color, along with the values for red, blue, and green, as well as hue, saturation, and lightness (HSL), saturation and value (HSV), and the proportions of cyan, magenta, yellow, and black (CMYK). This application was used to analyze the colors of HNB in the samples after the LAMP reactions.

6. Results (1) Plasmid DNA Sample Verification

Figure 4A:
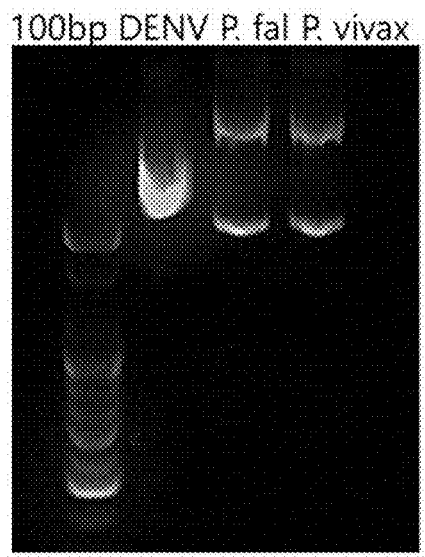
FIGS. 4A and 4B present the results of plasmid DNA gel electrophoresis and PCR amplification.
Figure 4B:
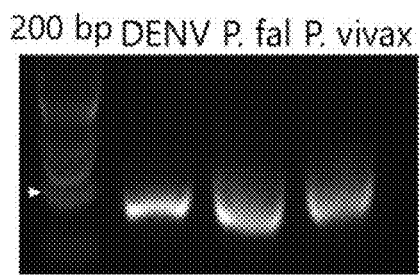

The three plasmid DNA samples were first verified by running them on an agarose gel (FIG. 4A). Following this, conventional PCR was performed using the designed LAMP outer primers under the following conditions: initial denaturation at 95° C. for 5 minutes, followed by 35 cycles of denaturation at 95° C. for 30 seconds, annealing at 58° C. for 30 seconds, and extension at 72° C. for 1 minute, with a final extension at 72° C. for 5 minutes. The results are presented in FIG. 4B.

(2) Analysis of Primer Specificity

Figure 5:
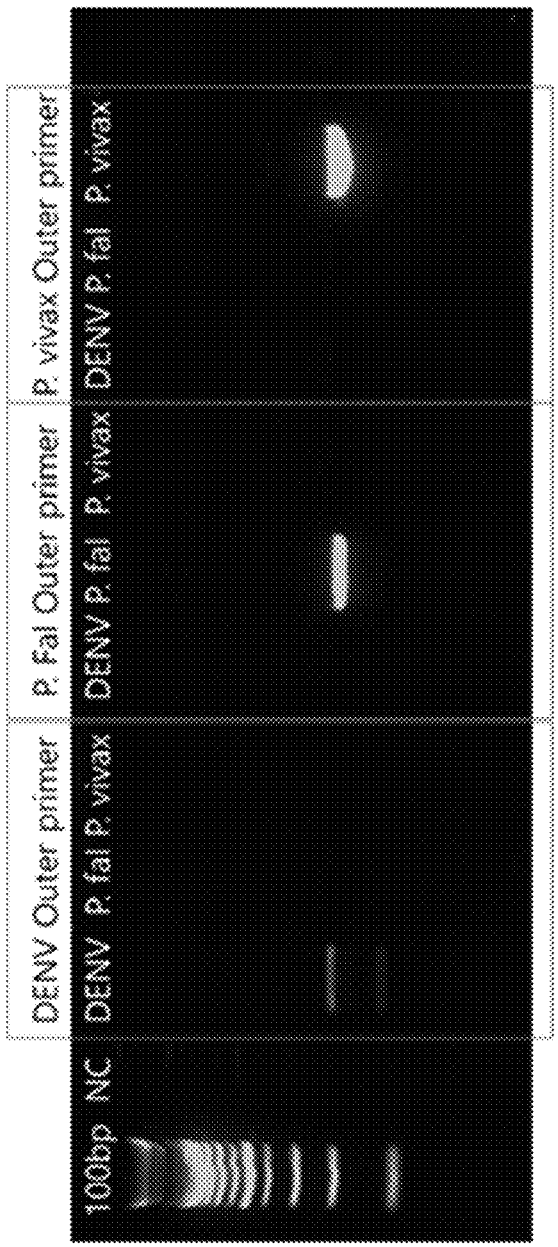
FIG. 5 shows an analysis of primer specificity in a cross-PCR experiment, where primers specific for DENV, P. falciparum (P. fal), and *P. vivax* were used to amplify DNA from corresponding plasmid templates. The PCR products were then loaded onto a 1.5% agarose gel for electrophoresis, demonstrating the specificity of each primer set for its target DNA.

Each plasmid DNA was amplified using its corresponding outer primer, and the PCR results demonstrated successful and specific amplification for each template. The specificity was confirmed by electrophoresis analysis presented in FIG. 5, where distinct bands corresponding to the expected sizes were observed, validating the precision of each primer set.

(3) Dye Color Change According to Solution

The color changes of the HNB dye when mixed with various reagents used in this experiment. The tubes display the dye's color response to each reagent adding, illustrating how the HNB dye reacts under different experimental conditions.

Figure 6:
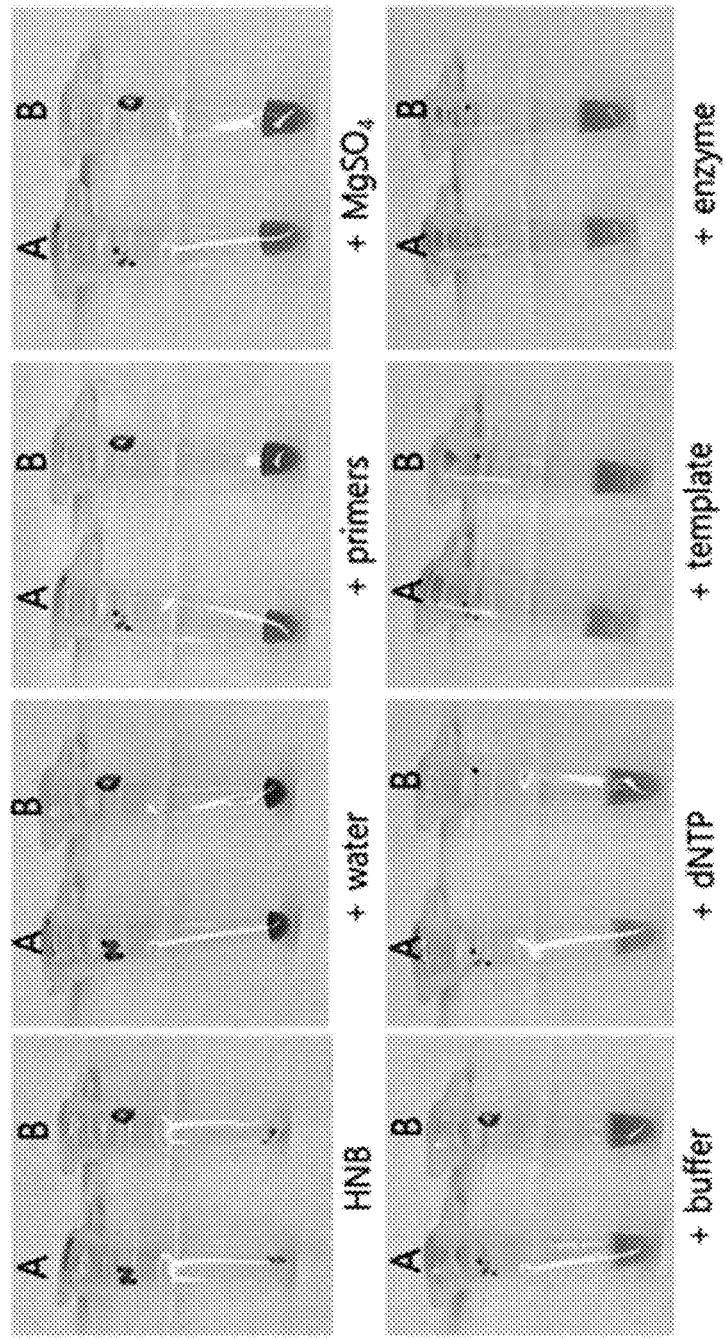
FIG. 6 shows results of HNB dye color changes in response to reagent compositions.

The visual color changes in the dye indicate its interaction with each reagent, providing insights into the chemical environment or conditions present in each case. FIG. 6 shows the sequential color changes of HNB dye observed as different solutions were added.

As shown in FIG. 6, each reagent addition caused a distinct color shift, indicating the progress of the reaction and enabling visual monitoring at each stage. This supports that HNB dye in the reagent composition of the present invention allows for effective visual assessment of DNA amplification through color change.

(4) Impact of betaine Presence on LAMP Results

Figure 7A:
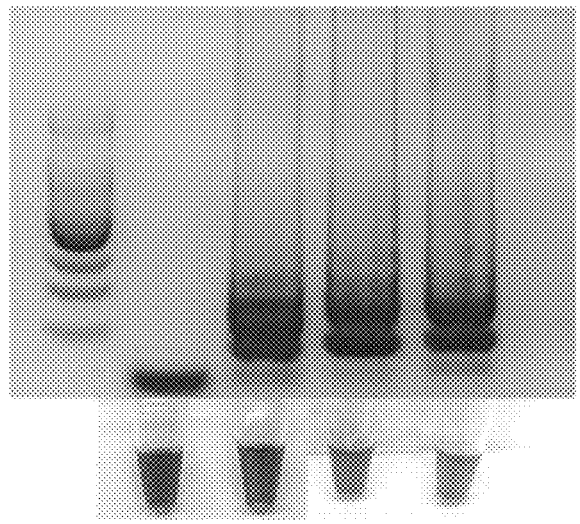
FIGS. 7A and 7B show the color change observed in the LAMP reaction with and without betaine.
Figure 7B:
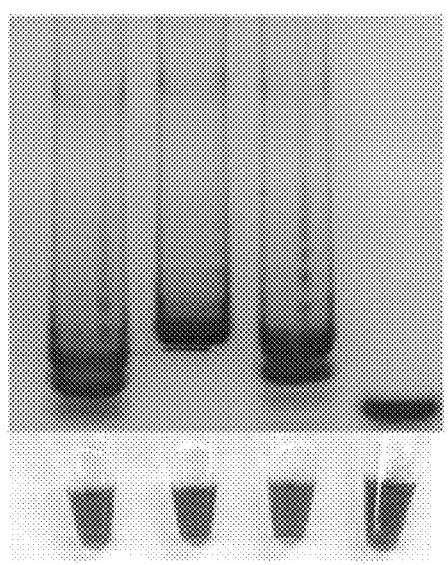

In the LAMP reaction, the effect of betaine on the stability of color change was investigated when using HNB as an indicator. Experiments were performed with and without the addition of betaine. The addition of betaine resulted in a more stable and consistent color change compared to the reactions without betaine as shown FIG. 7B. Additionally, the results were further confirmed by 1.5% agarose gel electrophoresis, which demonstrated the expected amplification patterns corresponding to the presence of betaine (FIG. 7A).

(5) Optimization of LAMP Reaction Time

For the time-dependent analysis of the LAMP reaction, 1 ng of template DNA was used in each reaction. The reactions were observed at intervals of 30, 45, 60, and 90 minutes. A slight color change was noted at around 30 minutes, with a more distinct and observable change at 45 minutes. The color remained stable up to 60 minutes. Accordingly, an optimal LAMP reaction time for DENV, P. falciparum, and P. vivax is 30 to 60 minutes, and preferably 40 to 50 minutes.

(6) Optimization of DNA Template Concentration

The time course and sensitivity analysis of the LAMP assay for detecting DENV, P. falciparum, and P. vivax was performed using a range of target DNA concentrations (10 ng to 1 fg). Reactions were monitored at 0, 30, 45, 60, and 90 minutes, with amplification indicated by a color change from purple to blue. Negative controls (NC) were included in each set.

Figure 8A:
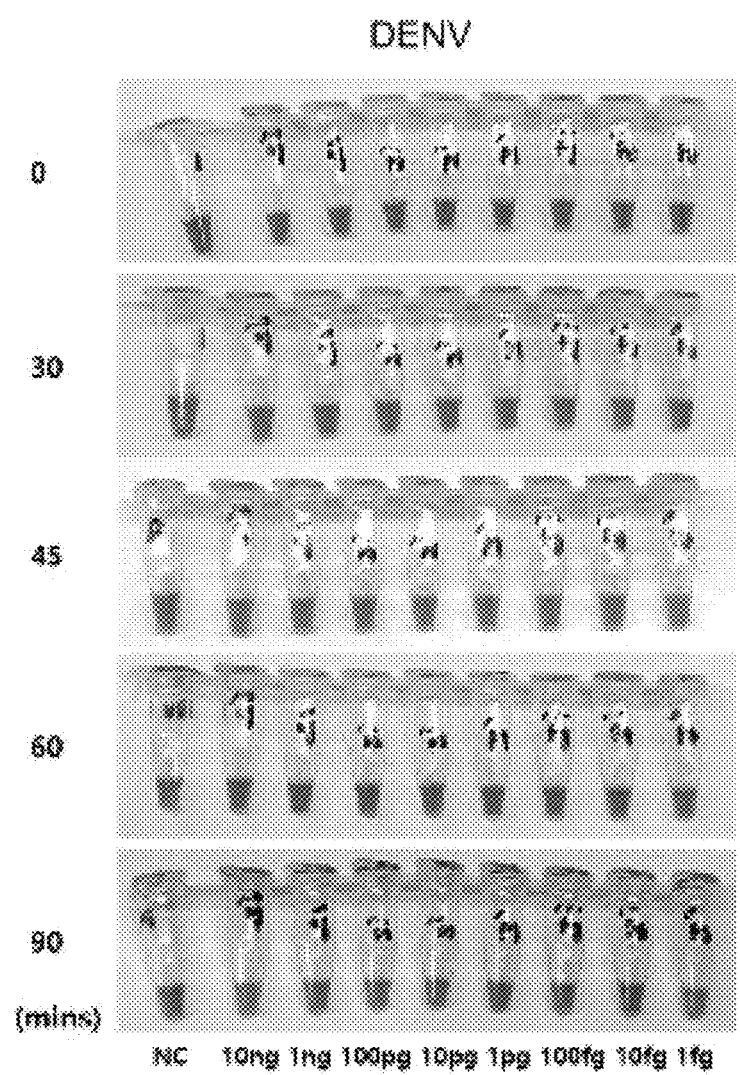
FIGS. 8A to 8C show the time-course and sensitivity analysis of the LAMP assay. Assays for DENV, P. falciparum, and *P. vivax* were conducted using DNA concentrations ranging from 10 ng to 1 fg. Reactions were monitored at 0, 30, 45, 60, and 90 minutes, with a color change from purple to blue indicating successful amplification.
Figure 8B:
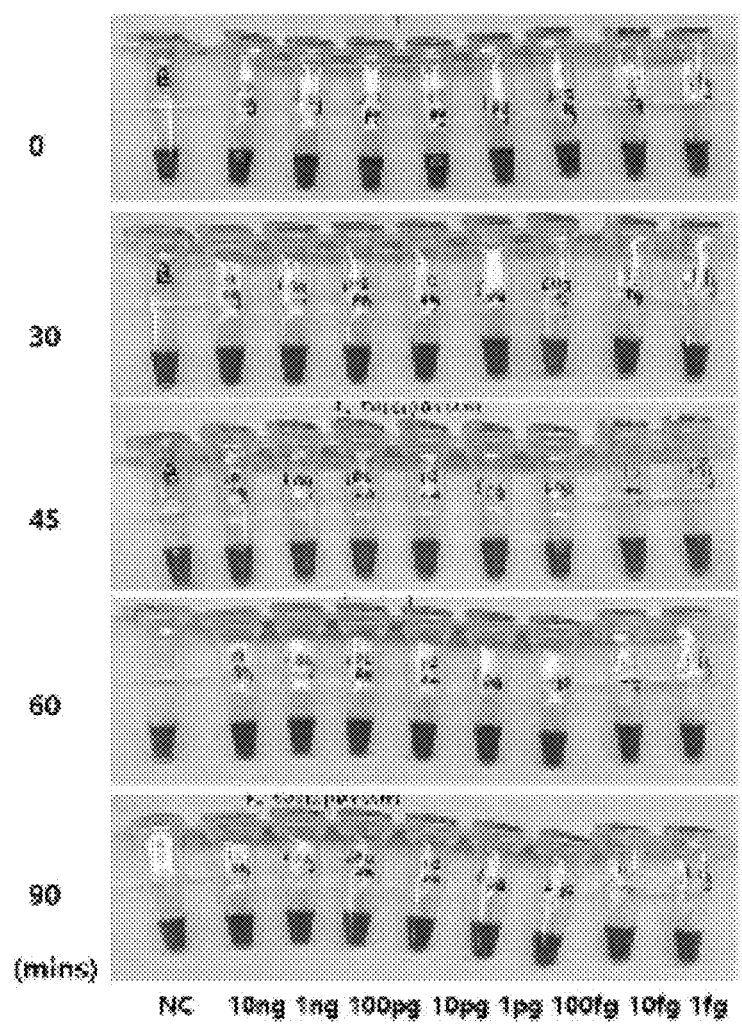
Figure 8C:
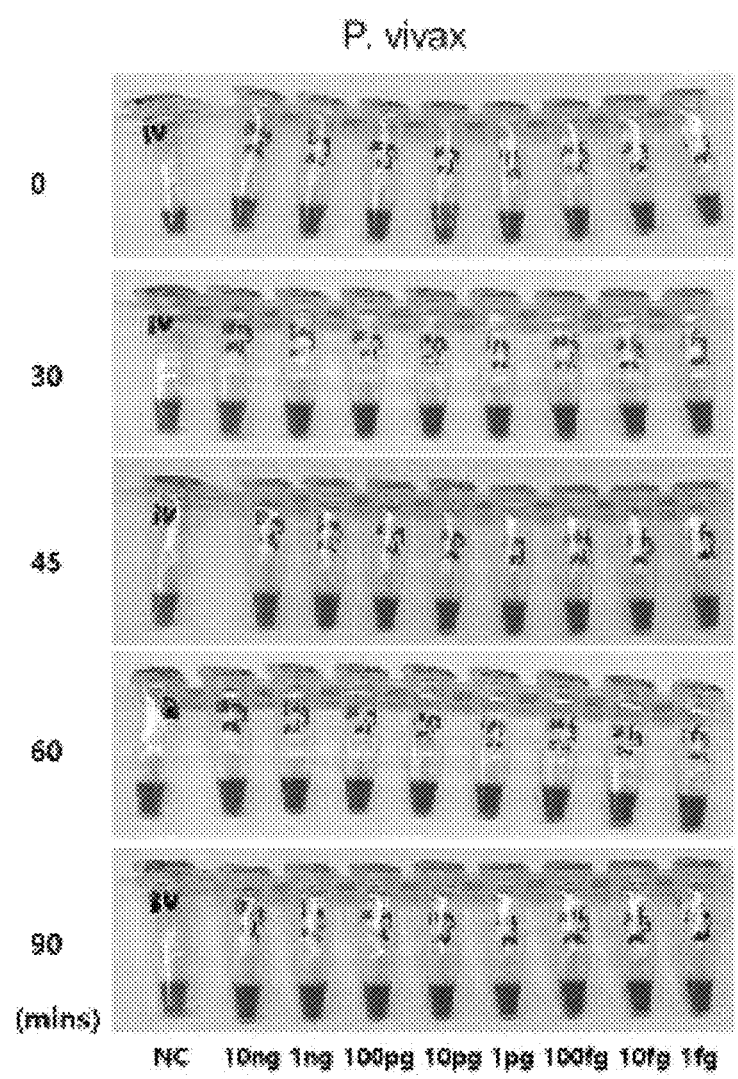

For DENV, amplification occurred within 45 minutes for 10 μg and higher DNA concentrations. In the case of P. falciparum, positive results were observed after 45 minutes at concentrations of 10 μg and above. For P. vivax, amplification was detected at concentrations as low as 1 pg, with results appearing after 30 minutes. This time-course analysis highlights the sensitivity of the LAMP assay, demonstrating its ability to detect low concentrations of DNA from these pathogens at different time points (FIGS. 8A to 8C).

The optimal (minimum) DNA template concentration for each pathogen in the LAMP reaction is shown in Table 3.

TABLE 3

| Pathogen | DNA template concentration (pg) | Reaction Time (min) |
| --- | --- | --- |
| DENV | 10 | 45 |
| P. falciparum | 10 | 45 |
| P. vivax | 1 | 30 |

What is claimed is:

1. A composition comprising:
   a first primer set consisting of the nucleotide sequences of SEQ ID Nos.1 to 6; and
   a second primer set consisting of the nucleotide sequences of SEQ ID Nos. 7 to 11.

2. The composition according to claim 1, further comprising a third primer set consisting of the nucleotide sequences of SEQ ID Nos. 12 to 16.

3. The composition according to claim 1, wherein the composition further comprises hydroxy naphthol blue (HNB).

4. The composition according to claim 1, wherein the composition further comprises betaine.

5. A multi-diagnostic kit for dengue and malaria, comprising the composition of claim 1.

6. The multi-diagnostic kit according to claim 5, wherein the composition further comprises a third primer set consisting of the nucleotide sequences of SEQ ID Nos. 12 to 16.

7. The multi-diagnostic kit according to claim 5, wherein the composition further comprises hydroxy naphthol blue (HNB).

8. The multi-diagnostic kit according to claim 5, wherein the composition further comprises betaine.

9. The multi-diagnostic kit according to claim 5, wherein the composition comprises a first reagent composition comprising the first primer set and a second reagent composition comprising the second primer set.

10. A method for diagnosing dengue and malaria, the method comprising:
    adding DNA extracted from a sample to the composition according to claim 1, wherein the sample is blood, saliva, urine, or tissue; and
    performing a loop-mediated isothermal amplification of the DNA.

11. The method according to claim 10, wherein the amplification is carried out at 60 to 65° C. for 0.5 to 1 hour.

12. The method according to claim 10, wherein the composition further comprises a third primer set consisting of the nucleotide sequences of SEQ ID Nos. 12 to 16, and an infection status of Dengue virus, Plasmodium falciparum, and *Plasmodium vivax* is individually indicated.

13. The method according to claim 10, wherein the composition further comprises a third primer set consisting of the nucleotide sequences of SEQ ID Nos. 12 to 16.

14. The method according to claim 10, wherein the composition further comprises hydroxy naphthol blue (HNB).

15. The method according to claim 10, wherein the composition further comprises betaine.

* * * * *

SEQUENCE LISTING

```
Sequence total quantity: 19
SEQ ID NO: 1              moltype = DNA  length = 20
FEATURE                   Location/Qualifiers
misc_feature              1..20
                          note = F3 for Dengue
source                    1..20
                          mol_type = other DNA
                          organism = synthetic construct
SEQUENCE: 1
cgttccattt aaccacacgt                                                  20

SEQ ID NO: 2              moltype = DNA  length = 20
FEATURE                   Location/Qualifiers
misc_feature              1..20
                          note = B3 for Dengue
source                    1..20
                          mol_type = other DNA
                          organism = synthetic construct
SEQUENCE: 2
gcaccaacag tctatgtctt                                                  20

SEQ ID NO: 3              moltype = DNA  length = 41
```

```
FEATURE               Location/Qualifiers
misc_feature          1..41
                      note = FIP for Dengue
source                1..41
                      mol_type = other DNA
                      organism = synthetic construct
SEQUENCE: 3
catgttcacg ccatcctctg ttggagaacc acacatgatc g                    41

SEQ ID NO: 4          moltype = DNA  length = 39
FEATURE               Location/Qualifiers
misc_feature          1..39
                      note = BIP for Dengue
source                1..39
                      mol_type = other DNA
                      organism = synthetic construct
SEQUENCE: 4
cctcatggcc atggaccttg gctcattctg cctgagaag                       39

SEQ ID NO: 5          moltype = DNA  length = 25
FEATURE               Location/Qualifiers
misc_feature          1..25
                      note = LF for Dengue
source                1..25
                      mol_type = other DNA
                      organism = synthetic construct
SEQUENCE: 5
cttttcccctt tctcttgtct gctga                                     25

SEQ ID NO: 6          moltype = DNA  length = 24
FEATURE               Location/Qualifiers
misc_feature          1..24
                      note = LB for Dengue
source                1..24
                      mol_type = other DNA
                      organism = synthetic construct
SEQUENCE: 6
gacacaatca cgtacaagtg tccc                                       24

SEQ ID NO: 7          moltype = DNA  length = 21
FEATURE               Location/Qualifiers
misc_feature          1..21
                      note = F3 for P. falciparum
source                1..21
                      mol_type = other DNA
                      organism = synthetic construct
SEQUENCE: 7
gcatttgtct aaaatacttc c                                          21

SEQ ID NO: 8          moltype = DNA  length = 18
FEATURE               Location/Qualifiers
misc_feature          1..18
                      note = B3 for P. falciparum
source                1..18
                      mol_type = other DNA
                      organism = synthetic construct
SEQUENCE: 8
cgaatactcg ccccagaa                                              18

SEQ ID NO: 9          moltype = DNA  length = 49
FEATURE               Location/Qualifiers
misc_feature          1..49
                      note = FIP for P. falciparum
source                1..49
                      mol_type = other DNA
                      organism = synthetic construct
SEQUENCE: 9
acctagtcgg catagtttat ggttataatc aagaacgaaa gttaaggga            49

SEQ ID NO: 10         moltype = DNA  length = 47
FEATURE               Location/Qualifiers
misc_feature          1..47
                      note = BIP for P. falciparum
source                1..47
                      mol_type = other DNA
                      organism = synthetic construct
SEQUENCE: 10
agtcatcttt cgaggtgact tttagcccaa agactttgat ttctcat              47
```

```
SEQ ID NO: 11              moltype = DNA    length = 23
FEATURE                    Location/Qualifiers
misc_feature               1..23
                           note = LF for P. falciparum
source                     1..23
                           mol_type = other DNA
                           organism = synthetic construct
SEQUENCE: 11
cgacggtatc tgatcgtctt cac                                              23

SEQ ID NO: 12              moltype = DNA    length = 21
FEATURE                    Location/Qualifiers
misc_feature               1..21
                           note = F3 for P. vivax
source                     1..21
                           mol_type = other DNA
                           organism = synthetic construct
SEQUENCE: 12
tcgtgaatat gatttgtctg g                                                21

SEQ ID NO: 13              moltype = DNA    length = 20
FEATURE                    Location/Qualifiers
misc_feature               1..20
                           note = B3 for P. vivax
source                     1..20
                           mol_type = other DNA
                           organism = synthetic construct
SEQUENCE: 13
agcaaataca ttcttacgcg                                                  20

SEQ ID NO: 14              moltype = DNA    length = 47
FEATURE                    Location/Qualifiers
misc_feature               1..47
                           note = FIP for P. vivax
source                     1..47
                           mol_type = other DNA
                           organism = synthetic construct
SEQUENCE: 14
tcagtcccac gtaagaatat atcgtttaat tccgataacg aacgaga                    47

SEQ ID NO: 15              moltype = DNA    length = 47
FEATURE                    Location/Qualifiers
misc_feature               1..47
                           note = BIP for P. vivax
source                     1..47
                           mol_type = other DNA
                           organism = synthetic construct
SEQUENCE: 15
tattgggata cgtaacagtt tcccaagaaa cagtatgaaa agcgaac                    47

SEQ ID NO: 16              moltype = DNA    length = 25
FEATURE                    Location/Qualifiers
misc_feature               1..25
                           note = LF for P. vivax
source                     1..25
                           mol_type = other DNA
                           organism = synthetic construct
SEQUENCE: 16
atttgccgct aattagcagg ttaag                                            25

SEQ ID NO: 17              moltype = DNA    length = 224
FEATURE                    Location/Qualifiers
source                     1..224
                           mol_type = genomic DNA
                           organism = Dengue virus
SEQUENCE: 17
attccaacag tgatggcgtt ccatttaacc acacgtaacg gagaaccaca catgatcgtc      60
agcagacaag agaaagggaa aagtcttctg tttaaaacag aggatggcgt gaacatgtgt     120
accctcatgg ccatggacct tggtgaattg tgtgaagaca caatcacgta caagtgtccc     180
cttctcaggc agaatgagcc agaagacata gactgttggt gcaa                      224

SEQ ID NO: 18              moltype = DNA    length = 228
FEATURE                    Location/Qualifiers
source                     1..228
                           mol_type = genomic DNA
                           organism = Plasmodium falciparum
SEQUENCE: 18
tgcgaaagca tttgtctaaa atacttccat taatcaagaa cgaaagttaa gggagtgaag      60
acgatcagat accgtcgtaa tcttaaccat aaactatgcc gactaggtgt tggatgaaag     120
```

```
tgttaaaaat aaaagtcatc tttcgaggtg acttttagat tgcttccttc agtaccttat    180
gagaaatcaa agtctttggg ttctggggcg agtattcgcg caagcgag                 228

SEQ ID NO: 19           moltype = DNA   length = 227
FEATURE                 Location/Qualifiers
source                  1..227
                        mol_type = genomic DNA
                        organism = Plasmodium vivax
SEQUENCE: 19
ttagttcgtg aatatgattt gtctggttaa ttccgataac gaacgagatc ttaacctgct    60
aattagcggc aaatacgata tattcttacg tgggactgaa ttcggttgat ttgcttactt    120
cgaagaaaat attgggatac gtaacagttt ccctttccct tttctactta gttcgctttt    180
catactgttt cttttcgcg taagaatgta tttgcttagt tgtaaag                   227
```